(12) United States Patent
Gong et al.

(10) Patent No.: US 11,452,172 B2
(45) Date of Patent: Sep. 20, 2022

(54) METHOD FOR SWITCHING MASTER EARPHONE, MOBILE TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 27 days.

(21) Appl. No.: 17/159,115

(22) Filed: Jan. 26, 2021

(65) Prior Publication Data
US 2021/0153293 A1 May 20, 2021

Related U.S. Application Data

(63) Continuation of application No. PCT/CN2019/088166, filed on May 23, 2019.

(30) Foreign Application Priority Data

Jul. 27, 2018 (CN) .......................... 201810842901.3

(51) Int. Cl.
*H04W 84/20* (2009.01)
*H04M 1/72412* (2021.01)
(Continued)

(52) U.S. Cl.
CPC ............. *H04W 84/20* (2013.01); *H04L 12/66* (2013.01); *H04M 1/72412* (2021.01);
(Continued)

(58) Field of Classification Search
CPC ..... H04W 84/20; H04W 40/16; H04W 40/18; H04W 40/20; H04L 12/66; H04L 47/28;
(Continued)

(56) References Cited

U.S. PATENT DOCUMENTS 9,854,414 B2 * 12/2017 Fraser ..................... H04M 1/00
10,176,698 B1 * 1/2019 Buschmann ....... G08B 21/0277
(Continued)

FOREIGN PATENT DOCUMENTS

| CN | 107241689 | 10/2017 |
|---|---|---|
| CN | 107547975 | 1/2018 |

(Continued)

OTHER PUBLICATIONS

EPO, Partial Supplementary European Search Report for EP Application No. 19840202.6, dated Jul. 19, 2021.
(Continued)

*Primary Examiner* — Eugene Yun
(74) *Attorney, Agent, or Firm* — Hodgson Russ LLP

(57) ABSTRACT

A method for switching a master earphone, a mobile terminal, and a non-transitory computer-readable storage medium are provided in implementations of the present disclosure. The method includes the following. When a mobile terminal is in a calling status, whether a condition for switching a master earphone is met is detected. When the condition is met, at least one silent time window is predicted based on voice call data. Within a first silent time window, the communication connection between the mobile terminal and a first earphone is disconnected, and a communication
(Continued)

connection between the mobile terminal and a second earphone is established, where the first silent time window is any one of the at least one silent time window.

12 Claims, 6 Drawing Sheets

(51) Int. Cl.
*H04L 12/66* (2006.01)
*H04R 1/10* (2006.01)

(52) U.S. Cl.
CPC ......... *H04R 1/1041* (2013.01); *H04R 1/1016* (2013.01); *H04R 2420/07* (2013.01)

(58) Field of Classification Search
CPC ......... H04M 1/72412; H04M 2250/74; H04M 1/6066; H04R 1/1041; H04R 1/1016; H04R 2420/07; H04R 1/1025; G10L 15/22; G10L 25/48; G10L 25/78
USPC ....................................................... 455/41.2
See application file for complete search history.

(56) References Cited

U.S. PATENT DOCUMENTS

2008/0187163 A1  8/2008  Goldstein et al.
2013/0316642 A1  11/2013  Newham

FOREIGN PATENT DOCUMENTS

| CN | 107894881 | 4/2018 |
|----|-----------|--------|
| EP | 3570275   | 11/2019 |
| WO | 2018135743 | 7/2018 |

OTHER PUBLICATIONS

EPO, Extended European Search Report for European Application No. 19840202.6, dated Oct. 20, 2021.
SIPO, First Office Action for CN Application No. 201810842901.3, dated Aug. 14, 2019.
WIPO, ISR for PCT/CN2019/088166, dated Jul. 19, 2019.

* cited by examiner

METHOD FOR SWITCHING MASTER EARPHONE, MOBILE TERMINAL, AND NON-TRANSITORY COMPUTER-READABLE STORAGE MEDIUM

CROSS-REFERENCE TO RELATED APPLICATIONS

This application is a continuation of International Application No. PCT/CN2019/088166, filed on May 23, 2019, which claims priority to Chinese Patent Application No. 201810842901.3, filed on Jul. 27, 2018, the entire disclosures of which are incorporated herein by reference.

TECHNICAL FIELD

This disclosure relates to the field of mobile terminal technology, and more particularly to a method for switching a master earphone, a mobile terminal, and a non-transitory computer-readable storage medium.

BACKGROUND

With maturity of wireless technology, there are more and more scenarios where a wireless earphone is connected with a mobile terminal such as a mobile phone through the wireless technology. The wireless earphones can be used for various functions such as listening to music and making phone calls. Generally speaking, a pair of wireless earphones includes a master earphone and a slave earphone. After the master earphone establishes a data transmission link with the mobile phone, the master earphone synchronizes received audio data to the slave earphone for playback. In a calling scenario, when the master earphone is no longer suitable to continue to be the master earphone due to changes in a position of the master earphone, etc., the master earphone and the slave earphone will be switched. The process of switching between the master earphone and the slave earphone will cause a short-term calling interruption and affect calling experience of a user.

SUMMARY

Implementations provide a method for switching a master earphone, a mobile terminal, and a non-transitory computer-readable storage medium.

In a first aspect, a method for switching a master earphone is provided. The method for switching a master earphone is applicable to a mobile terminal that is in communication connection with a first earphone of a wireless earphone, the first earphone is in communication connection with a second earphone of the wireless earphone, and the method includes the following.

When the mobile terminal is in a calling status, whether a condition for switching a master earphone is met is detected. At least one silent time window is predicted based on voice call data when the condition is met. Within a first silent time window, the communication connection between the mobile terminal and the first earphone is disconnected, and a communication connection between the mobile terminal and the second earphone is established, where the first silent time window is any one of the at least one silent time window.

In a second aspect, an apparatus for switching a master earphone is provided. The apparatus for switching a master earphone is applicable to a mobile terminal that is in communication connection with a first earphone of a wireless earphone, the first earphone is in communication connection with a second earphone of the wireless earphone, and the apparatus includes a detecting unit, a predicting unit, a communication connection disconnecting unit, and a communication connection establishing unit.

The detecting unit is configured to detect whether a condition for switching a master earphone is met when the mobile terminal is in a calling status. The predicting unit is configured to predict at least one silent time window based on voice call data when the condition is met. The communication connection disconnecting unit is configured to disconnect the communication connection between the mobile terminal and the first earphone within a first silent time window, where the first silent time window is any one of the at least one silent time window. The communication connection establishing unit is configured to establish a communication connection between the mobile terminal and the second earphone within the first silent time window.

In a third aspect, a mobile terminal is provided. The mobile terminal includes a processor, a memory configured to store one or more programs. The one or more programs are configured to be executed by the processor and the one or more programs include instructions for performing some or all operations of the method described in the first aspect.

In a fourth aspect, a computer-readable storage medium is provided. The computer-readable storage medium is configured to store computer programs for electronic data interchange (EDI). The computer programs include instructions for performing some or all operations of the method described in the first aspect.

In a fifth aspect, a non-transitory computer program product is provided. The computer program product includes a non-transitory computer-readable storage medium that stores computer programs. The computer programs are operable with a computer to execute some or all operations of the method described in the first aspect.

As can be seen, in implementations of the present disclosure, the mobile terminal is in the communication connection with the first earphone of the wireless earphone, the first earphone is in the communication connection with the second earphone of the wireless earphone, and the first earphone connected with the mobile terminal is the master earphone. When the mobile terminal is in the calling status, whether the condition for switching a master earphone is met is detected. When the condition is met, the at least one silent time window is predicted based on the voice call data. Within the first silent time window, the communication connection between the mobile terminal and the first earphone is disconnected, and the communication connection between the mobile terminal and the second earphone is established, where the first silent time window is any one of the at least one silent time window. A silent time window is a time period during which no voice data is generated during a call. By means of the implementations, the master earphone is switched in the silent time window so as to avoid a loss of important voice data due to switching of the master earphone during a voice call and reduce an influence on a call due to the switching of the master earphone.

BRIEF DESCRIPTION OF THE DRAWINGS

In order to describe technical solutions of implementations more clearly, the following will give a brief description of accompanying drawings used for describing the implementations. Apparently, accompanying drawings described below are merely some implementations. Those of ordinary

DETAILED DESCRIPTION

In order for those skilled in the art to better understand technical solutions of implementations, technical solutions of implementations will be described clearly and completely with reference to accompanying drawings in the implementations. Apparently, implementations hereinafter described are merely some implementations, rather than all implementations, of the disclosure. All other implementations obtained by those of ordinary skill in the art based on the implementations herein without creative efforts shall fall within the protection scope of the disclosure.

The terms "first", "second", "third", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

A mobile terminal referred to herein may include various handheld devices, in-vehicle devices, wearable devices, computing devices that have wireless communication functions or other processing devices connected to a wireless modem, as well as various forms of user equipments (UE), mobile stations (MS), terminal devices, and the like. For ease of description, the above-mentioned devices are collectively referred to as a mobile terminal.

Hereinafter, detailed description of implementations of the present disclosure will be given below.

Figure 1:
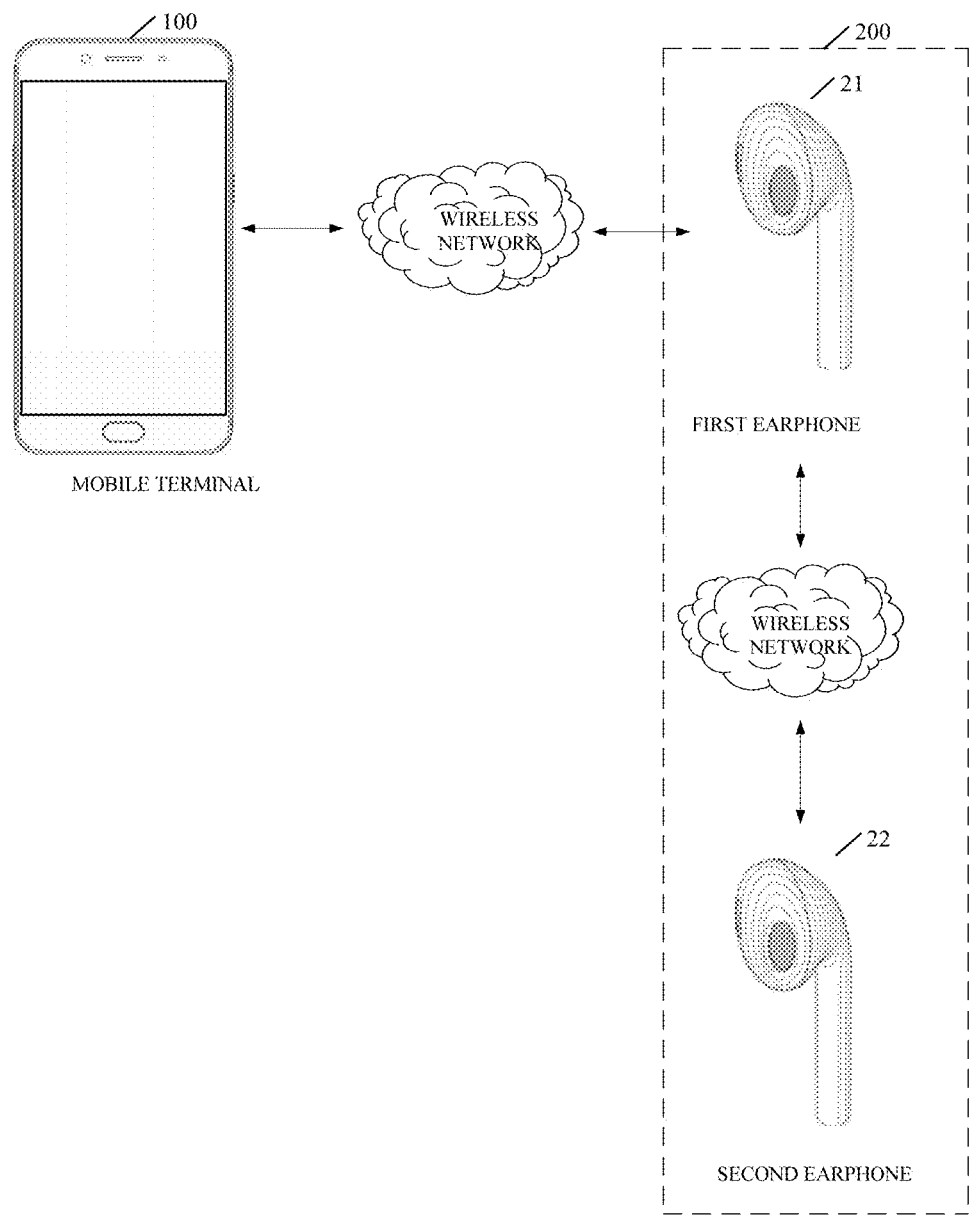
FIG. 1 is a schematic structural diagram of network architecture according to implementations.

FIG. 1 is a schematic structural diagram of network architecture according to implementations. As illustrated in FIG. 1, the network architecture includes a mobile terminal 100 and a wireless earphone 200. The wireless earphone 200 includes a first earphone 21 and a second earphone 22, the mobile terminal 100 is in communication connection with the first earphone 21 through a wireless network (i.e., Wi-Fi and Bluetooth), and the first earphone 21 is in communication with the second earphone 22 through a wireless network.

The mobile terminal 100 may include various handheld devices, in-vehicle devices, wearable devices, computing devices that have wireless communication functions or other processing devices connected to a wireless modem, as well as various forms of user equipments (UE), mobile stations (MS), terminal devices, and the like.

The first earphone 21 in FIG. 1 establishes a communication connection with the mobile terminal 100, the first earphone 21 is a master earphone in the wireless earphone 200, and the second earphone 22 is a slave earphone in the wireless earphone 200. The master earphone refers to an earphone that establishes a communication connection with the mobile terminal 100. When communication quality between the first earphone 21 and the mobile terminal 100 is poor, a communication connection between the mobile terminal 100 and the first earphone 21 is disconnected, a communication connection between the mobile terminal 100 and the second earphone 22 is established, in this way, the second earphone 22 is switched to as a master earphone, thereby realizing switching of the master earphone.

In an example, the wireless earphone can be ear hook earphones, earbuds, or over-ear/on-ear earphones, which is not limited herein.

The wireless earphone can be accommodated in an earphone case. The earphone case can include two receive cavities (i.e., a first receive cavity and a second receive cavity) and one or more earphone housing magnetic components which are disposed in the earphone case. The two receive cavities are designed for receiving the first earphone and the second earphone both in size and shape. The one or more earphone housing magnetic components are configured to attract and fix magnetically the first earphone and the second earphone in the two receive cavities respectively. The earphone case can further include a cover. In terms of size and shape, the first receive cavity is designed for receiving the first earphone, and the second receive cavity is designed for receiving the second earphone.

The wireless earphone can include an earphone housing, a rechargeable remaining electric quantity (such as a lithium remaining electric quantity) accommodated in the earphone housing, multiple metal contacts for coupling the rechargeable remaining electric quantity with a charging device, and a speaker assembly including a driver unit and a directional voice port. The driver unit includes a magnetic body, a voice coil, and an isolation membrane. The driver unit is configured to make a sound from the directional voice port. The multiple metal contacts are arranged on an outer surface of the earphone housing.

In an example, the wireless earphone further includes a touch area. The touch area is located on the outer surface of the earphone housing. The touch area is provided with at least one touch sensor to detect touch operations. The touch sensor can include a capacitive sensor. When the touch area is touched by a user, at least one capacitive sensor will detect its own change in capacitance, thereby recognizing touch operations.

In an example, the wireless earphone further includes an acceleration sensor and a three-axis gyroscope. The acceleration sensor and the three-axis gyroscope are accommodated in the earphone housing to recognize a pick-up operation and a take-out operation of the wireless earphone.

In an example, the wireless earphone further includes at least one barometric pressure sensor. The barometric pressure sensor can be disposed on the outer surface of the earphone housing and is configured to detect barometric pressure in an ear after the wireless earphone is put on. Thus, tightness of an earphone in a wearing state can be detected with the barometric pressure sensor. When the wireless earphone is detected to be loosely worn, the wireless earphone can send prompt information to an electronic device coupled with the wireless earphone, to remind a user that the wireless earphone has a risk of falling off.

Figure 2:
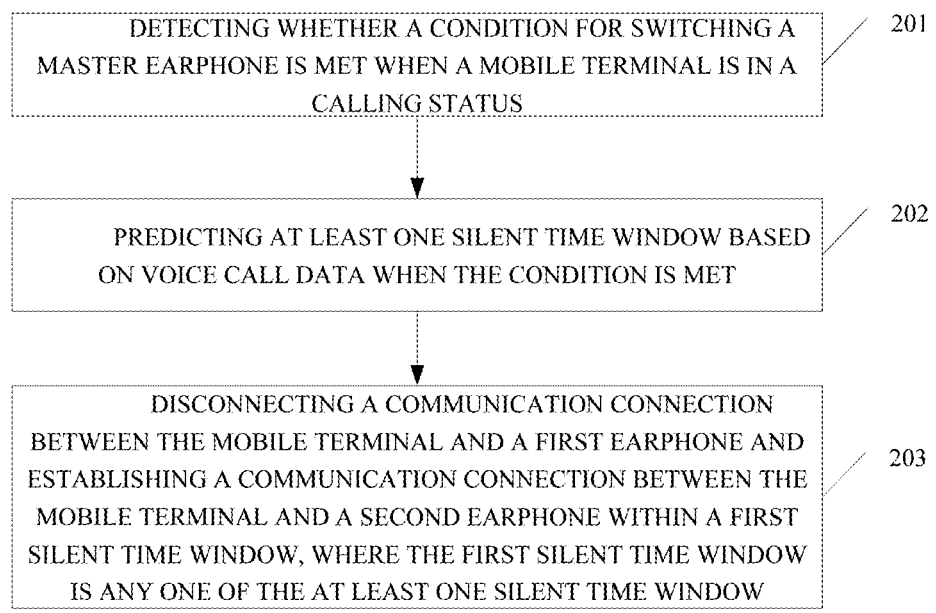
FIG. 2 is a schematic flowchart of a method for switching a master earphone according to implementations.

FIG. 2 is a schematic flowchart of a method for switching a master earphone according to implementations. As illustrated in FIG. 2, the method for switching a master earphone includes the following.

201, when a mobile terminal is in a calling status, the mobile terminal detects whether a condition for switching a master earphone is met.

In this implementation, the calling status refers to a status where the mobile terminal is in a phone-connected status. When the mobile terminal is the calling status, a first user talks with a second user through the mobile terminal, where the first user can receive voice call data sent from the second user through the mobile terminal, and the first user can send voice call data sent from the second user through the mobile terminal. The voice call data refers to voice data sent during a call between the first user and the second user.

When the mobile terminal communicates with a pair of wireless earphones, in order to reduce power consumption of the mobile terminal and communication complexity of the mobile terminal, a communication connection is established between the mobile terminal and only one of the wireless earphones, and the earphone that has the communication connection with the mobile terminal is a master earphone the master earphone not only has the communication connection with the mobile terminal, but also has a communication connection with a slave earphone. After the master earphone receives audio data sent from the mobile terminal, the master earphone will synchronize the audio data to the slave earphone for playback.

For example, the wireless earphone includes a first earphone and a second earphone, the mobile terminal establishes a communication connection with the first earphone of the wireless earphone, and the first earphone of the wireless earphone establishes a communication connection with the second earphone of the wireless earphone. The wireless earphone includes a pair of earphones (i.e., the first earphone and the second earphone), where the first earphone is the master earphone and the second earphone is the slave earphone. The master earphone establishes a communication connection with the mobile terminal, the slave earphone is not connected with the mobile terminal directly, and the slave earphone establishes a communication connection with the master earphone. The communication connection may be a Bluetooth connection.

A condition for switching the master earphone may be determined according to communication quality between the mobile terminal and the first earphone. When the communication quality between the mobile terminal and the first earphone is poor, the master earphone is switched from the first earphone to the second earphone.

For example, when the mobile terminal is connected with the first earphone, the mobile terminal may acquire a first received signal strength indicator (RSSI) of a signal received by the mobile terminal from the first earphone. The first RSSI is used to measure signal strength of the signal received by the mobile terminal from the first earphone. The unit of RSSI can be decibel relative to one milliwatt (dBm) or alone signal unit (ASU). dBm represents an absolute value of power and the signal strength is generally a negative number. The smaller the absolute value, the stronger the signal strength. ASU is a defined unique signal unit, and the larger the value, the stronger the signal strength. When the first RSSI is less than a preset strength threshold, it is determined that the condition for switching a master earphone is met.

The preset strength threshold can be set and stored in advance in a non-volatile memory of the mobile terminal. For example, the preset strength threshold can be set to −95 dBm.

As an implementation, the condition for switching a master earphone can be determined according to an electric quantity of the first earphone and an electric quantity of the second earphone. When the first earphone is the master earphone, the mobile terminal can acquire a remaining electric quantity of the first earphone and a remaining electric quantity of the second earphone. When the remaining electric quantity of the first earphone is less than the remaining electric quantity of the second earphone and a difference between the remaining electric quantity of the first earphone and the remaining electric quantity of the second earphone is greater than a preset remaining electric quantity threshold, the condition for switching a master earphone can be determined to be met.

The preset remaining electric quantity threshold can be set and stored in advance in the non-volatile memory of the mobile terminal. For example, the preset strength threshold can be set to 20% of a total electric quantity of an earphone.

As an implementation, at 201, the mobile terminal detects whether a condition for switching a master earphone is met as follows.

The mobile terminal detects a first distance between the mobile terminal and the first earphone, a second distance between the mobile terminal and the second earphone, and a third distance between the first earphone and the second earphone. The mobile terminal determines that the condition for switching a master earphone is met when the first distance is greater than the second distance and the third distance is greater than or equal to a first threshold.

In some implementations, the terminal detects the first distance between the terminal and the first earphone, the second distance between the terminal and the second earphone, and the third distance between the first earphone and the second earphone as follows. The terminal obtains a first position of the first earphone, a second position of the second earphone, and a third position of the terminal. The terminal determines the first distance according to the first position and the third position, determines the second distance according to the second position and the third position, and determines the third distance according to the first position and the second position.

The terminal can determine, on its own, a position of the terminal directly through wireless-fidelity (Wi-Fi) positioning technology, but is unable to determine, on its own, a position of the first earphone and a position of the second earphone through Wi-Fi positioning technology.

The terminal can determine the position of the first earphone and the position of the second earphone as follows. The second earphone determines the position of the second earphone through Wi-Fi positioning technology, and reports periodically to the first earphone the position of the second earphone. The first earphone, upon receiving the position of the second earphone reported by the second earphone, determines the position of the first earphone through Wi-Fi positioning technology, and reports to the terminal the position of the first earphone and the position of the second earphone. The terminal receives the position of the first earphone and the position of the second earphone that are reported by the first earphone.

The terminal can determine the third position of the terminal as follows. Upon receiving the position of the first earphone and the position of the second earphone reported by the first earphone, the terminal determines the position of the terminal through Wi-Fi positioning technology.

It should be noted that, according to implementations herein, the terminal can first determine the third position and then determine the first position and the second position, which is not limited herein. While performing Wi-Fi positioning technology, the terminal, the first earphone, and the second earphone share one wireless access point. The position of the terminal, the position of the first earphone, and the position of the second earphone each are expressed by coordinates. A distance between two points can be determined as long as a position of each of the two points is known, which belongs to the related art and thus will not be elaborated herein.

In some implementations, the terminal detects the first distance between the terminal and the first earphone, the second distance between the terminal and the second earphone, and the third distance between the first earphone and the second earphone as follows. The terminal determines a first RSSI value of a signal between the first earphone and the terminal, and determines the first distance according to the first RSSI value. The terminal determines a second RSSI value of a signal between the second earphone and the terminal, and determines the second distance according to the second RSSI value. The terminal determines a third RSSI value of a signal between the first earphone and the second earphone, and determines the third distance according to the third RSSI value.

Since the terminal is connected with the first earphone, the terminal can determine directly the first RSSI value of a signal between the terminal and the first earphone. However, the terminal is unable to determine directly the second RSSI value of a signal between the terminal and the second earphone and the third RSSI value of a signal between the first earphone and the second earphone.

The terminal can determine the third RSSI value of a signal between the first earphone and the second earphone as follows. The first earphone determines the third RSSI value of a signal between the first earphone and the second earphone. The first earphone sends the third RSSI value to the terminal. The terminal receives the third RSSI value from the first earphone. Alternatively, the terminal sends to the first earphone a request for acquiring RSSI value. Upon receiving the request for acquiring RSSI value, the first earphone determines the third RSSI value of a signal between the first earphone and the second earphone and sends the third RSSI value to the terminal. The terminal receives the third RSSI value from the first earphone.

The terminal can determine the second RSSI value of a signal between the terminal and the second earphone as follows. The second earphone sends periodically a Bluetooth low energy (BLE) broadcast to the terminal by means of BLE broadcast. The terminal, upon receiving the BLE broadcast from the second earphone, can acquire the second RSSI value of a signal between the second earphone and the terminal.

The terminal can determine a distance according to an RSSI value as follows. The terminal determines, according to a mapping relationship between distances and RSSI values, a distance corresponding to the RSSI value. In the mapping relationship between distances and RSSI values, the RSSI value is inversely proportional to the distance, that is, a high RSSI value corresponds to a short distance, and a low RSSI value corresponds to a long distance.

The terminal may detect the first distance, the second distance, and the third distance in the following order. The terminal, upon receiving the BLE broadcast from the second earphone, acquires the second RSSI value. The terminal first determines the second distance according to the second RSSI value and then sends to the first earphone the request for acquiring RSSI value. The first earphone, upon receiving the request for acquiring RSSI value, determines the third RSSI value and sends the third RSSI value to the terminal. The terminal, upon receiving the third RSSI value from the first earphone, determines the third distance according to the third RSSI value. The terminal determines the first RSSI value and then determines the first distance according to the first RSSI value.

Alternatively, the terminal can first determine the first distance, then determine the second distance, and finally determine the third distance, or first determine the third distance, then determine the first distance, and finally determine the second distance, and the disclosure is not limited in this regard.

In this implementation the present disclosure, the mobile terminal detects not only the first distance and the second distance, but also the third distance, so as to prevent the mobile terminal from switching the master earphone repeatedly. When the third distance is less than the first threshold, it indicates that the first earphone is close to the second earphone. Even if the master earphone is switched, communication quality of the master earphone will not be significantly improved. Therefore, when the first distance is greater than the second distance and the third distance is greater than or equal to the first threshold, the condition for switching a master earphone is determined to be met. The first threshold can be set and stored in advance in the memory of the mobile terminal. For example, the first threshold can be set to 50 cm.

202, the mobile terminal predicts at least one silent time window based on voice call data when the condition for switching a master earphone is met.

In this implementation of the present disclosure, a silent time window refers to a time period during a voice call during which neither party of the voice call speaks. The time length of the silent time window may be 0.5 seconds, 1 second, 2 seconds, etc., which is not limited herein. Since different users have different speaking habits and speech speeds during a call, the time length of the silent time window may be different for calls between different parties. Even if between the same two parties, different emotional states of the two parties may lead to different time lengths of the silent time window.

The mobile terminal can predict the at least one silent time window based on the voice call data as follows.

The mobile terminal predicts, based on the voice call data, a time point when a next voice pause for both two parties occurs, and a voice pause duration of the next voice pause.

When the voice pause duration of the next voice pause is longer than a preset duration, a time period of the next voice pause is determined as a silent time window, and the time point when the next voice pause occurs is determined as a starting point of the silent time window.

In this implementation, the voice call data refers to voice data of two parties during the call. A duration of the voice call data may be a fixed value (i.e., 100 ms).

The mobile terminal can recognize whether the voice call data conforms to (i.e., matches) a voice pause model. When the voice call data conforms to the voice pause model, the voice pause duration of the next voice pause can be determined according to a pause parameter in the voice pause model. The voice pause model can be obtained by training multiple voice samples. The pause parameter may include a time point when the next voice pause occurs, and a voice pause duration of the next voice pause. The voice samples may include pre-collected user's voices including a pause(s). The voice pause model can include voice features and the voice features can include voice amplitude, voice frequency, a changing trend of the voice amplitude, intonation, and the like.

The voice pause duration (i.e., pause duration) refers to a time period during which voice amplitude of voice data in the voice call data is continuously lower than a preset amplitude threshold. For example, during a call between two parties, a pause duration after one of the two parties finishes a sentence is determined as voice pause duration.

The mobile terminal recognizes whether the voice call data conforms to the voice pause model as follows.

The mobile terminal extracts voice features in the voice call data, and calculates whether a matching degree between the voice features in the voice call data and voice features in the voice pause model is greater than a preset matching degree. If the matching degree between the voice features in the voice call data and the voice features in the voice pause model is greater than the preset matching degree, the voice call data is determined to conform to the voice pause model.

As an implementation, the mobile terminal predicts the at least one silent time window based on the voice call data as follow.

The mobile terminal identifies whether the voice call data contains a preset keyword. The mobile terminal predicts a target pause duration after a voice segment containing the preset keyword as a silent time window when the voice call data contains the preset keyword.

As an implementation, the method further includes the following the target pause duration after the voice segment containing the preset keyword is predicted as the silent time window.

The mobile terminal determines a type of the preset keyword, determines the target pause duration corresponding to the type of the preset keyword according to a correspondence between types of the preset keyword and pause durations, determines whether the target pause duration is longer than a reference switching duration, and predicts the target pause duration after the voice segment containing the preset keyword as the silent time window when the target pause duration is longer than the reference switching duration.

As an implementation, the voice call data is between a first user and a second user, the first user is a user of the mobile terminal, and the mobile terminal predicts the at least one silent time window based on the voice call data as follows.

The mobile terminal presets a pause duration in voice data sent from the first user to the second user as a silent time window. The mobile terminal presets a pause duration in voice data sent from the second user to the first user as a silent time window. The mobile terminal presets a pause duration in voice data sent from the first user to the second user and a pause duration in voice data sent from the second user to the first user as a silent time window.

The voice data may refer to, in the voice call data, the voice data sent from the first user to the second user, the voice data sent from the second user to the first user, or the voice data sent from the first user to the second user and the voice data sent from the second user to the first user.

In this implementation, the mobile terminal may set a pause duration after the first user finishes a sentence as the silent time window, or can also set the pause duration after the second user finishes a sentence as the silent time window, which is not limited herein. In the implementation, a pause duration after at least one of the first user and the second user finishes a sentence is determined as the silent time window, thereby avoiding switching of the master earphone before a sentence is finished, avoiding a loss of important voice data due to the switching of the master earphone during the voice call, and reducing an influence on a call due to the switching of the master earphone.

As an implementation, the voice call data is between the first user and the second user, the first user is a user of the mobile terminal, and the mobile terminal predicts the at least one silent time window based on the voice call data as follows.

The mobile terminal acquires a first average pause duration of the first user and a second average pause duration of the second user in previous call records between the first user and the second user. When the first average pause duration is longer than the second average pause duration, the mobile terminal presets a pause duration in the voice data sent from the first user to the second user as a silent time window. When the second average pause duration is greater than the first average pause duration, the mobile terminal presets a pause duration in the voice data sent from the second user to the first user as a silent time window.

In this implementation, the mobile terminal compares an average pause duration after the first user finishes a sentence with an average pause duration after the second user finishes a sentence, and select a pause duration of a user with a longer average pause duration as the silent time window, so that there is sufficient time for the mobile terminal to switch the master earphone in the silent time window when the mobile terminal is in the calling status, so as to avoid a loss of important voice data due to the switching of the master earphone, thereby reducing an influence on a call due to the switching of the master earphone.

As an implementation, the voice call data is between the first user and the second user, the first user is a user of the mobile terminal, and the mobile terminal predicts the at least one silent time window based on the voice call data as follows.

The mobile terminal acquires a first speech rate of the first user and a second speech rate of the second user. When the first speech rate of the first user is greater than the second speech rate of the second user, the mobile terminal presets a pause duration in the voice data sent from the second user to the first user as a silent time window. When the second speech rate of the second user is greater than the first speech rate of the first user, the mobile terminal presets a pause duration in the voice data sent from the first user to the second user as a silent time window.

In this implementation, the mobile terminal compares the speech rate of the first user with the speech rate of the second user. Generally speaking, a user who speaks faster may have shorter sentence-to-sentence pauses, and a user who speaks more slowly may have longer sentence-to-sentence pauses. In this implementation, a pause duration after a user with a less speech rate finishes a sentence is selected as the silent time window, so that there is sufficient time for the mobile terminal to switch the master earphone in the silent time window when the mobile terminal is in the calling status, so as to avoid a loss of important voice data due to the switching of the master earphone, thereby reducing an influence on a call due to the switching of the master earphone.

203, within a first silent time window, the mobile terminal disconnects the communication connection between the mobile terminal and the first earphone and establishes a communication connection between the mobile terminal and the second earphone, where the first silent time window is any one of the at least one silent time window.

In this implementation, the communication connection between the mobile terminal and the first earphone is disconnected and the communication connection between the mobile terminal and the second earphone is established, that is, the master earphone of the mobile terminal is switched from the first earphone to the second earphone. A duration of the first silent time window is longer than a duration for the mobile terminal to perform operations of disconnecting the communication connection between the mobile terminal and the first earphone and establishing the communication connection between the mobile terminal and the second earphone.

When the condition for switching a master earphone is not met, proceed to operations at 201.

By means of implementations of the present disclosure, the master earphone is switched in the silent time window so as to avoid a loss of important voice data due to switching of the master earphone during a voice call and reduce an influence on a call due to the switching of the master earphone.

Figure 3:
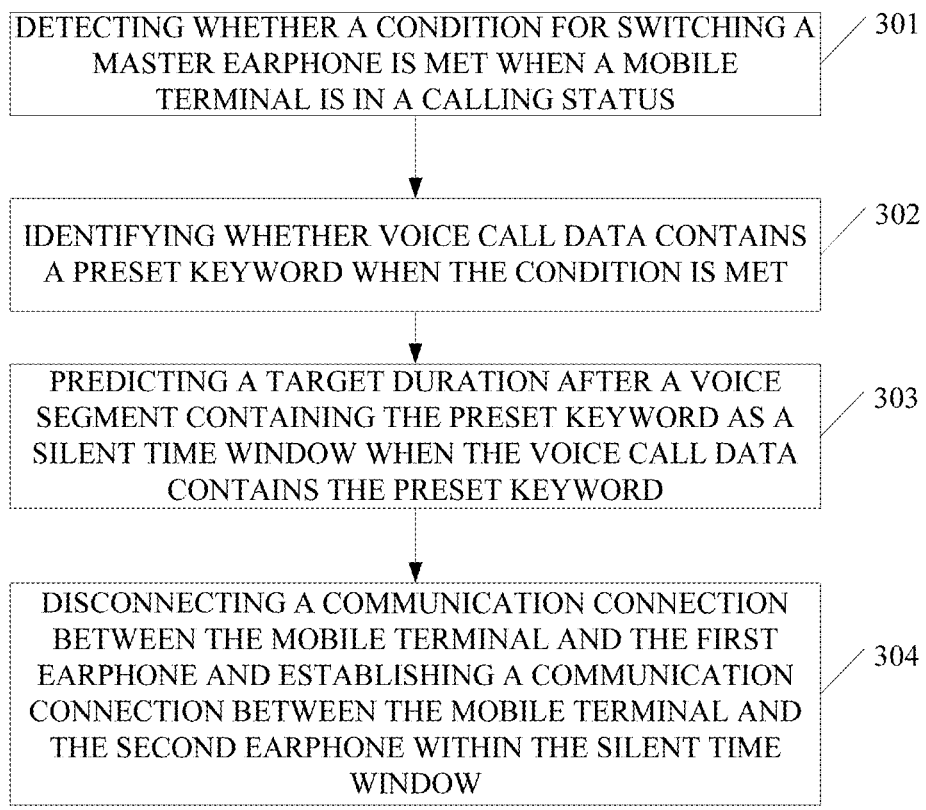
FIG. 3 is a schematic flowchart of a method for switching a master earphone according to other implementations.

FIG. 3 is a schematic flowchart of a method for switching a master earphone according to other implementations. As illustrated in FIG. 3, the method for switching a master earphone includes the following.

301, when a mobile terminal is in a calling status, the mobile terminal detects whether a condition for switching a master earphone is met.

For specific implementations of operations at 301, reference can be made to descriptions of operations at 201, which will not be repeated here.

302, when the condition for switching a master earphone is met, the mobile terminal identifies whether voice call data contains a preset keyword.

303, when the voice call data contains the preset keyword, the mobile terminal predicts a target pause duration after a voice segment containing the preset keyword as a silent time window.

In this implementation, the preset keyword includes a word which is indicative that a pause may be going to occur. For example, the preset keyword can include at least one of: "wait a minute", "wait", "think about", "look at", "hold on", and on the like. For voice call data in Chinese, the preset keywords can also include a modal particle that is indicative of the end of a sentence. For example, "ma", "ya", "ne", "a", "la", "lou", "dui ba", "shi ma", "ke yi ma", xing ma", and the like.

The voice segment refers to a voice corresponding to a sentence, and the voice segment may include multiple continuous voice call data. For example, a duration of each piece of voice call data is 100 ms, and the voice segment may include 30 pieces of voice call data. Generally speaking, a pause duration between two voice segments will be longer than a certain duration (i.e., 200 ms). When it is detected that both two consecutive pieces of voice call data are silent data, this voice segment is considered to be over. When the voice call data in the voice segment contains the preset keyword, the target pause duration after the voice segment can be determined as a silent time window.

In this implementation, by identifying whether the voice call data contains the preset keyword, whether the target pause duration after the voice segment including the voice call data can be determined as a silent time window. Generally speaking, when the voice call data contains the preset keyword, a pause duration after the voice segment containing the voice call data may be longer, and the pause duration can be determined as a silent time window for the switching of the master earphone. By means of this implementation, a time period with a longer pause duration can be predicted as the silent time window, so that there is sufficient time for the mobile terminal to switch the master earphone in the silent time window when the mobile terminal is in the calling status, so as to avoid a loss of important voice data due to the switching of the master earphone, thereby reducing an influence on a call due to the switching of the master earphone.

304, the mobile terminal disconnects a communication connection between the mobile terminal and the first earphone and establishes a communication connection between the mobile terminal and the second earphone within the silent time window.

When the voice call data does not contain the preset keyword, proceed to operations at 301.

Figure 4:
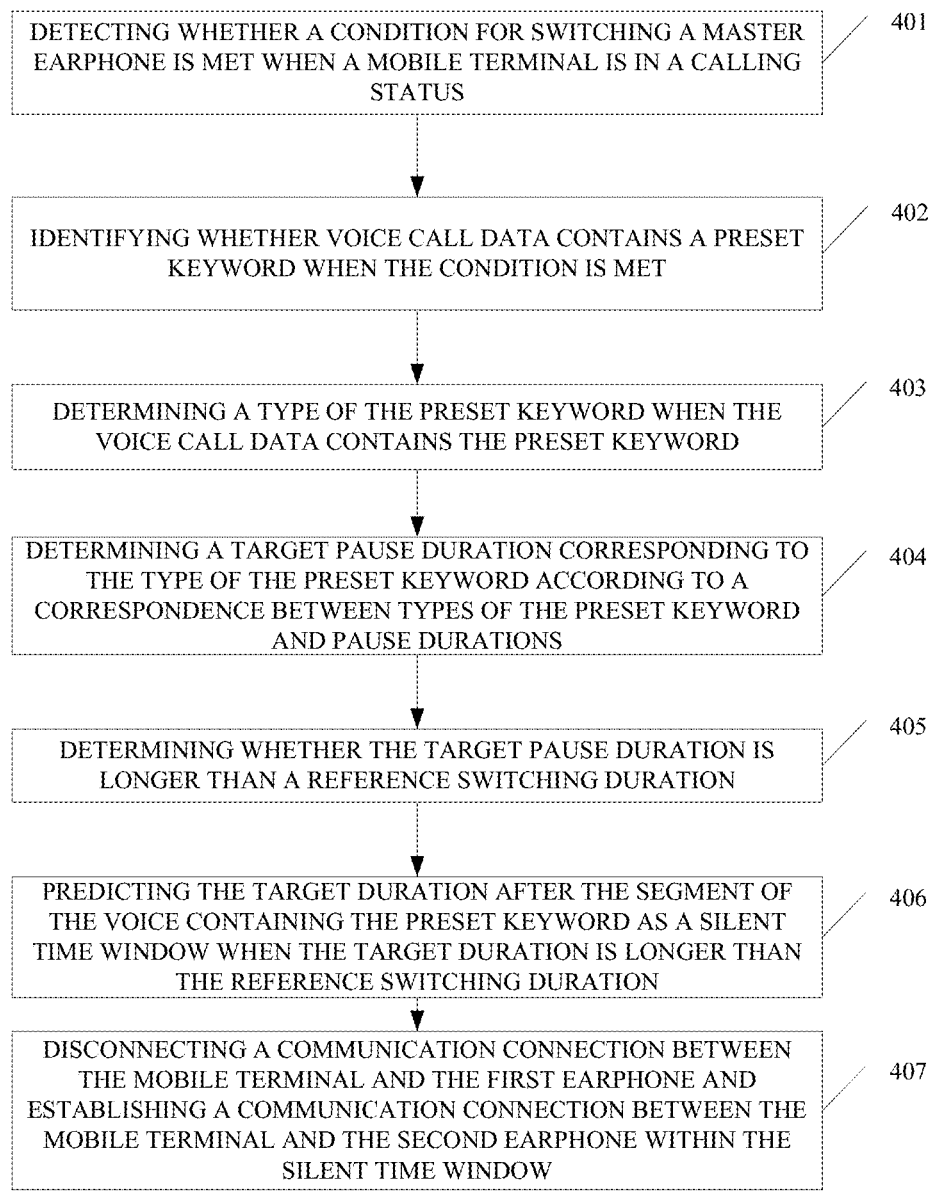
FIG. 4 is a schematic flowchart of a method for switching a master earphone according to other implementations.

FIG. 4 is a schematic flowchart of a method for switching a master earphone according to other implementations. As illustrated in FIG. 4, the method for switching a master earphone includes the following.

401, when a mobile terminal is in a calling status, the mobile terminal detects whether a condition for switching a master earphone is met.

402, when the condition for switching a master earphone is met, the mobile terminal identifies whether voice call data contains a preset keyword.

For specific implementations of operations at 401 and 402, reference can be made to descriptions of operations at 301 and 302, which will not be repeated here.

403, when the voice call data contains the preset keyword, the mobile terminal determines a type of the preset keyword.

404, the mobile terminal determines a target pause duration corresponding to the type of the preset keyword according to a correspondence between types of the preset keyword and pause durations.

405, the mobile terminal determines whether the target pause duration is longer than a reference switching duration.

406, the mobile terminal predicts the target pause duration after the voice segment containing the preset keyword as the silent time window when the target pause duration is longer than the reference switching duration.

In this implementation, the type of the preset keyword may include a modal particle which is indicative the end of a sentence, and may also include a type of word which is indicative that a voice pause is going to occur. Different modal particles may correspond to different pause durations. A correspondence between modal particles and pause durations can be determined according to a correspondence between modal particles and pause duration of previously recorded user's voice data. For example, for different users, pause durations after the same modal particle may be different. An average pause duration of a user of the mobile terminal (i.e., the first user) after the user speaks a modal particle can be counted as a pause duration corresponding to the modal particle.

The reference switching duration is a duration required by the mobile terminal to perform the switching of the master earphone. The reference switching duration may be determined based on switching durations previously recorded. For example, an average of the switching durations previously recorded can be determined as the reference switching duration. When the target pause duration is longer than the reference switching duration, it indicates that the mobile terminal can complete the switching of the master earphone within the target pause duration, and the switching of the master earphone has less influence on the voice call. When the target pause duration is shorter than the reference switching duration, it indicates that it is difficult for the mobile terminal to complete the switching of the master earphone within the target pause duration, and the switching of the master earphone may have an influence on the voice call.

In this implementation, whether the voice call data contains the preset keyword is identified. When a pause duration corresponding to the preset keyword is longer, a time period corresponding to the longer pause duration is determined as the silent time window, so that there is sufficient time for the mobile terminal to switch the master earphone in the silent time window when the mobile terminal is in the calling status, so as to avoid a loss of important voice data due to the switching of the master earphone, thereby reducing an influence on a call due to the switching of the master earphone.

When the target pause duration is less than or equal to the reference switching duration, proceed to operations at 402.

407, the mobile terminal disconnects a communication connection between the mobile terminal and the first earphone and establishing a communication connection between the mobile terminal and the second earphone within the silent time window.

For specific implementations of operations at 406 and 407, reference can be made to descriptions of operations at 303 and 304, which will not be repeated here.

By means of the implementations, the master earphone is switched in the silent time window so as to avoid a loss of important voice data due to switching of the master earphone during a voice call and reduce an influence on a call due to the switching of the master earphone.

The foregoing solution of the implementations of the present disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementations should not be considered as beyond the scope of the present disclosure.

According to the implementations of the present disclosure, functional units may be divided for the first wireless earphone in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations is schematic, and is merely a logical function division, and there may be other division manners in actual implementation.

Figure 5:
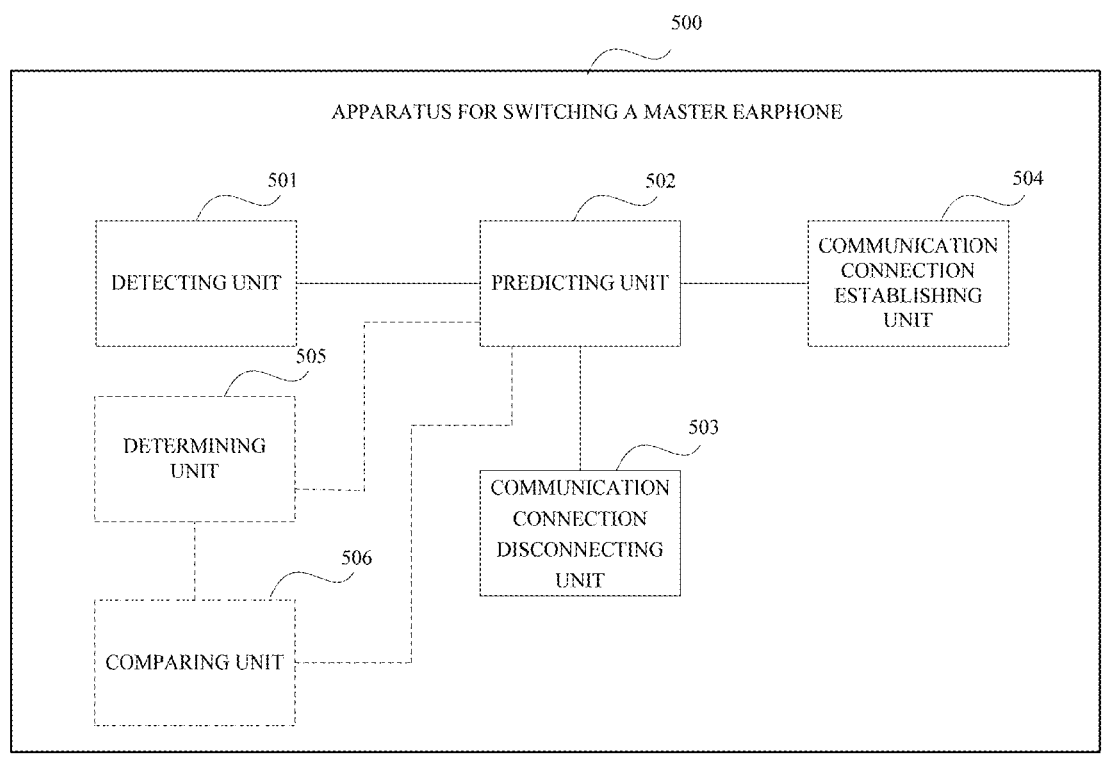
FIG. 5 is a schematic structural diagram of an apparatus for switching a master earphone according to implementations.

FIG. 5 is a schematic structural diagram of an apparatus for switching a master earphone according to implementations. The apparatus for switching a master earphone 500 is applicable to a mobile terminal that is in communication connection with a first earphone of a wireless earphone, and the first earphone is in communication connection with a second earphone of the wireless earphone. As illustrated in FIG. 5, the apparatus for switching a master earphone 500 includes a detecting unit 501, a predicting unit 502, a communication connection disconnecting unit 503, and a communication connection establishing unit 504.

The detecting unit 501 is configured to detect whether a condition for switching a master earphone is met when the mobile terminal is in a calling status.

The predicting unit 502 configured to predict at least one silent time window based on voice call data when the detecting unit 501 detects that the condition is met.

The communication connection disconnecting unit 503 is configured to disconnect the communication connection between the mobile terminal and the first earphone within a first silent time window, where the first silent time window is any one of the at least one silent time window.

The communication connection establishing unit 504 is configured to establish a communication connection between the mobile terminal and the second earphone within the first silent time window.

As an implementation, the predicting unit 502 configured to predict the at least one silent time window based on the voice call data is configured to: identify whether the voice call data contains a preset keyword; predict a target pause duration after a voice segment containing the preset keyword as a silent time window when the voice call data contains the preset keyword.

As an implementation, the apparatus for switching a master earphone 500 further includes a determining unit 505 and a comparing unit 506.

The determining unit 505 is configured to determine a type of the preset keyword before the predicting unit 502 predicts the target pause duration after the voice segment containing the preset keyword as the silent time window. The determining unit 505 is further configured to determine the target pause duration corresponding to the type of the preset keyword according to a correspondence between types of the preset keyword and pause durations.

The comparing unit 506 is configured to determine whether the target pause duration is longer than a reference switching duration.

The predicting unit 502 is configured to predict the target pause duration after the voice segment containing the preset keyword as the silent time window when the comparing unit 506 determines that the target pause duration is longer than the reference switching duration.

As an implementation, the voice call data is between a first user and a second user, the first user is a user of the mobile terminal, and the predicting unit 502 configured to predict the at least one silent time window based on the voice call data is configured to one of: preset a pause duration in voice data sent from the first user to the second user as a silent time window; preset a pause duration in voice data sent from the second user to the first user as a silent time window; or preset a pause duration in voice data sent from the first user to the second user and a pause duration in voice data sent from the second user to the first user as a silent time window.

As an implementation, the voice call data is between a first user and a second user, the first user is a user of the mobile terminal, and the predicting unit 502 configured to predict the at least one silent time window based on the voice call data is configured to: acquire a first average pause duration of the first user and a second average pause duration of the second user in previous call records between the first user and the second user; preset a pause duration in the voice data sent from the first user to the second user as a silent time window when the first average pause duration is longer than the second average pause duration; preset a pause duration in the voice data sent from the second user to the first user as a silent time window when the second average pause duration is greater than the first average pause duration.

As an implementation, the voice call data is between a first user and a second user, the first user is a user of the mobile terminal, and the predicting unit 502 configured to predict the at least one silent time window based on the voice call data is configured to: acquire a first speech rate of the first user and a second speech rate of the second user; preset a pause duration in the voice data sent from the second user to the first user as a silent time window when the first speech rate of the first user is greater than the second speech rate of the second user; preset a pause duration in the voice data sent from the first user to the second user as a silent time window when the second speech rate of the second user is greater than the first speech rate of the first user.

As an implementation, the detecting unit 501 configured to detect whether the condition for switching a master earphone is met is configured to: detect a first distance between the mobile terminal and the first earphone, a second distance between the mobile terminal and the second earphone, and a third distance between the first earphone and the second earphone; determine that the condition for switching a master earphone is met when the first distance is greater than the second distance and the third distance is greater than or equal to a first threshold.

As an implementation, the detecting unit 501 configured to detect whether the condition for switching a master earphone is met is configured to: acquire a first received signal strength indicator (RSSI) of a signal received by the mobile terminal from the first earphone; determine that the condition for switching a master earphone is met when the first RSSI is less than a preset strength threshold.

As an implementation, the detecting unit 501 configured to detect whether the condition for switching a master earphone is met is configured to: acquire a remaining electric quantity of the first earphone and a remaining electric quantity of the second earphone; detect that the condition for switching a master earphone is met when the remaining electric quantity of the first earphone is less than the remaining electric quantity of the second earphone and a difference between the remaining electric quantity of the first earphone and the remaining electric quantity of the second earphone is greater than a preset remaining electric quantity threshold.

For specific implementations of the apparatus for switching a master earphone 500, reference can be made to method implementations as illustrated in FIG. 1 to FIG. 4, which will not be repeated here.

By means of the apparatus for switching a master earphone 500, the master earphone is switched in the silent time window so as to avoid a loss of important voice data due to switching of the master earphone during a voice call and reduce an influence on a call due to the switching of the master earphone.

In the implementations of the present disclosure, the units can refer an application-specific integrated circuit (ASIC), a processor, a memory configured to implement one or more software or hardware programs, a integrated logical circuit, and/or other devices that can provide above functions. In addition, the above units or sub-units can be implemented via the processor of mobile terminal illustrated in FIG. 6.

Figure 6:
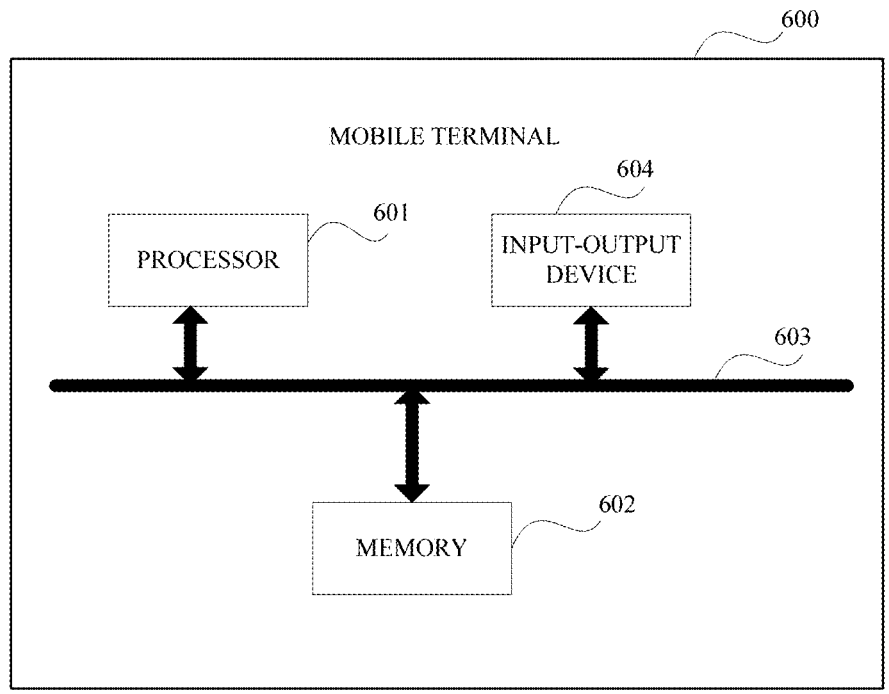
FIG. 6 is a schematic structural diagram of a mobile terminal according to implementations.

FIG. 6 is a schematic structural diagram of a mobile terminal according to implementations. As illustrated in FIG. 6, the mobile terminal 600 includes a processor 601 and a memory 602. The mobile terminal 600 may also include a bus 603. The processor 601 and the memory 602 may be connected with each other through the bus 603. The bus 603 may be a peripheral component interconnect (PCI) bus or extended industry standard architecture (EISA) bus, etc. The bus 603 can include an address bus, a data bus, a control bus, and the like. For ease of description, only one thick line is used in FIG. 6 to represent the bus 603, but it does not mean that there is only one bus or only one type of bus. The mobile terminal 600 may also include an input-output device 604, and the input-output device 604 may include a display screen, such as a liquid crystal display (LCD) screen. The memory 602 is configured to store one or more programs including instructions. The processor 601 is configured to call the instructions stored in the memory 602 to execute some or all of operations of the method as illustrated in FIGS. 1 to 4.

By means of the mobile terminal as illustrated in FIG. 6, the master earphone is switched in the silent time window so as to avoid a loss of important voice data due to switching of the master earphone during a voice call and reduce an influence on a call due to the switching of the master earphone.

Figure 7:
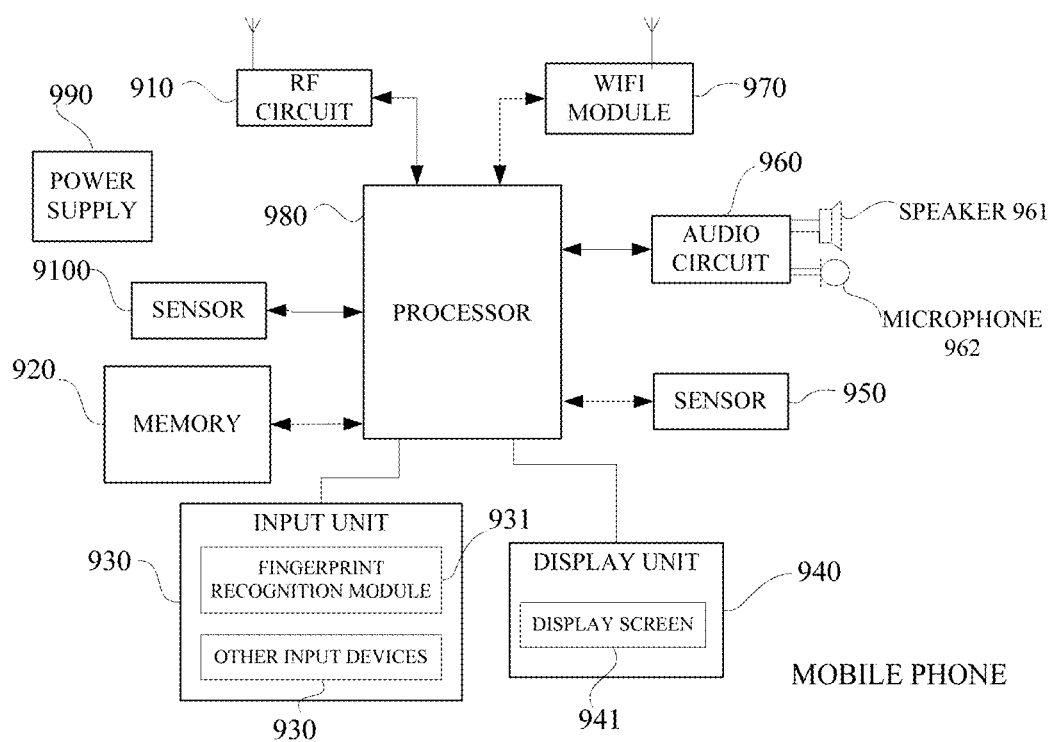
FIG. 7 is a schematic structural diagram of a mobile terminal according to other implementations.

Implementations of the present disclosure also provide another mobile terminal. For ease of description, only parts related to implementations of the present disclosure are described and for specific technical details that are not described, reference can be made to method implementations of the present disclosure. As illustrated in FIG. 7, the mobile terminal can include a mobile phone, a tablet computer, a personal digital assistant (PDA), a point of sales (POS), a vehicle-mounted computer, and other mobile devices. A mobile phone will be taken as an example of the mobile terminal in the following.

FIG. 7 is a schematic structural diagram of a part of structure s of a mobile terminal that is related to the mobile terminal provided in implementations. As illustrated in FIG. 7, the mobile phone includes: a radio frequency (RF) circuit 910, a memory 920, an input unit 930, a display unit 940, a sensor 950, an audio circuit 960, a wireless fidelity (Wi-Fi) module 970, a processor 980, a power supply 990, and other elements. It will be appreciated by those skilled in the art that the present disclosure is not limited by the mobile terminal as illustrated in FIG. 7. More or fewer elements than that as illustrated in FIG. 7 can be included, some elements may be or combined, or elements can be arranged differently.

Hereinafter, detailed description of each element of the mobile terminal will be given below with reference of FIG. 7.

The RF circuit 910 can be configured to receive and transmit information. Generally, the RF circuit 910 includes but is not limited to an antenna, at least one amplifier, a transceiver, a coupler, a low noise amplifier (LNA), a duplexer, and the like. Furthermore, the RF circuit 910 may also be configured to communicate with a network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules. The processor 980 is configured to execute various function applications and data processing of the mobile phone by running the software programs and the modules stored in the memory 920. The memory 920 can mainly include a program storage area and a data storage area. The program storage area can store an operating system, applications required for at least one function (such as a data backup function, a function of scanning two-dimensional code, and a function of determining compatibility), and so on. The data storage area can store data (such as the first data set and the second data set backed up) created according to use of the mobile phone, and so on. In addition, the memory 920 can include a high-speed RAM, and can further include a non-volatile memory such as at least one disk storage device, a flash device, or other non-volatile solid storage devices.

The input unit 930 is configured to receive input digital or character information and to generate key signal input associated with user setting and functional control of the mobile phone. In some possible implementations, the input unit 930 may include a fingerprint identification module 931 and other input devices 932. The fingerprint identification module 931 is configured to collect use's fingerprint data thereon. The input unit 930 can further include other input devices 932 in addition to the fingerprint identification module 931. Specifically, the other input devices 932 can include, but are not limited to, one or more of a physical keyboard, a functional key (such as a volume control key, a switch key, and so on), a track ball, a mouse, and an operating rod.

The display unit 940 is configured to display information input by the user, information provided for the user, or various menus of the mobile phone. The display unit 940 can include a display panel 941, and in some possible implementations, the display panel 941 may be configured in the form of a liquid crystal display (LCD), an organic light-emitting diode (OLED), and so on.

The mobile phone may also include at least one sensor 950, such as a light sensor, a motion sensor, and other sensors. As an implementation, the light sensor may include an ambient light sensor and a proximity sensor. The ambient light sensor can be configured to adjust the brightness of the display panel 941 according to ambient lights, and the proximity sensor can be configured to turn off the display panel 941 and/or backlight when the mobile phone reaches nearby the ear. As one kind of motion sensor, an accelerometer sensor can be configured to detect the magnitude of acceleration in different directions (typically three axes) and the accelerometer sensor can also be configured to detect the magnitude and direction of gravity when mobile phone is stationary. The accelerometer sensor can also be configured to identify mobile-phone gestures related applications (such as vertical and horizontal screen switch, related games, magnetometer attitude calibration), and can be used for vibration-recognition related functions (such as a pedometer, or percussion), and so on. The mobile phone can also be equipped with other sensors such as a gyroscope, a barometer, a hygrometer, a thermometer, an infrared sensor, etc., which will not be repeated herein.

The audio circuit 960, the speaker 991, and the microphone 992 can provide an audio interface between the user and the mobile phone. The audio circuit 960 can be configured to convert received audio data into electrical signals and transfer the electrical signals to the speaker 991; the speaker 991 is configured to convert the electrical signals received into sound signals for output. On the other hand, the microphone 992 is configured to convert the received sound signals into electrical signals, which will be received and then converted into audio data by the audio circuit 960. The audio data is then transmitted to the processor 980 to be processed. The audio data processed by the processor 980 is transmitted to another mobile phone via an RF circuit 910 for example or is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 7, it is to be noted that the Wi-Fi module 970 is not essential to the mobile phone and can be omitted according to actual needs without departing from the essential nature of the present disclosure.

The processor 980 is a control center of the mobile phone, and is configured to connect all parts of the whole mobile phone by utilizing various interfaces and lines, to run or execute the software programs and/or the modules stored in the memory 920, and to call data stored in the memory 920 to execute various functions and data processing of the mobile phone, so as to monitor the mobile phone as a whole. Optionally, in some implementations, the processor 980 can include one or more processing units. In some possible implementations, the processor 980 may be integrated with an application processor and a modulation-demodulation processor. The application processor is mainly configured to process an operating system, a user interface, an application program, and the like, and the modulation-demodulation processor is mainly configured to process wireless communication. It can be noted that the modulation-demodulation processor may not be integrated into the processor 980.

The mobile phone also includes a power supply 990 (e.g., a battery) that supplies power to various elements. For instance, the power supply 990 may be logically connected to the processor 980 via a power management system to achieve management of charging, discharging, and power consumption through the power management system.

The mobile phone also includes a camera 9100, and the camera 9100 is configured to capture images and videos and transmit the images and videos captured to the processor 980 for processing.

Although not illustrated, the mobile phone may include a Bluetooth® module, etc., and the present disclosure will not elaborate herein.

The methods of the foregoing implementations as illustrated in FIGS. 1-4 can be implemented based on the structure of the terminal illustrated in FIG. 7.

A non-transitory computer storage medium is also provided. The non-transitory computer storage medium is configured to store programs which, when executed, are operable to execute some or all of the steps of any of the methods for switching a master earphone as described in the above-described method implementations.

A computer program product is also provided. The computer program product includes a non-transitory computer-readable storage medium that stores computer programs.

The computer programs are operable with a computer to execute some or all operations of the method switching a master earphone as described in the above-described method implementations.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in an implementation, reference may be made to related descriptions in other implementations.

In the implementations of the present disclosure, it is to be noted that, the apparatus disclosed in implementations provided herein may be implemented in other manners. For example, the device/apparatus implementations described above are merely illustrative; for instance, the division of the unit is only a logical function division and there can be other manners of division during actual implementations; for example, multiple units or components may be combined or may be integrated into another system, or some features may be ignored, omitted, or not performed. In addition, coupling or communication connection between each illustrated or discussed component may be direct coupling or communication connection, may be indirect coupling or communication among devices or units via some interfaces, and may be electrical connection, mechanical connection, or other forms of connection.

The units described as separate components may or may not be physically separated, and the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be noted by those of ordinary skill in the art that all or a part of the various methods of the implementations described above may be accomplished by means of a program to instruct associated hardware, where the program may be stored in a computer-readable memory, which may include a flash memory, a read-only memory (ROM), a random-access memory (RAM), a disk or a compact disc (CD), and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for switching a master earphone, applicable to a mobile terminal that is in communication connection with a first earphone of a wireless earphone, the first earphone being in communication connection with a second earphone of the wireless earphone, and the method comprising:

detecting whether a condition for switching the master earphone is met when the mobile terminal is in a calling status;

predicting at least one silent time window based on voice call data when the condition is met; and disconnecting the communication connection between the mobile terminal and the first earphone and establishing a communication connection between the mobile terminal and the second earphone within a first silent time window, wherein the first silent time window is any one of the at least one silent time window;

wherein predicting the at least one silent time window based on the voice call data comprises:

identifying whether the voice call data contains a preset keyword;

determining a type of the preset keyword;

determining a target pause duration corresponding to the type of the preset keyword according to a correspondence between types of the preset keyword and pause durations;

determining whether the target pause duration is longer than a reference switching duration; and predicting the target pause duration after a voice segment containing the preset keyword as a silent time window when the voice call data contains the preset keyword and the target pause duration is longer than the reference switching duration.

2. The method of claim 1, wherein detecting whether the condition for switching the master earphone is met comprises:

detecting a first distance between the mobile terminal and the first earphone, a second distance between the mobile terminal and the second earphone, and a third distance between the first earphone and the second earphone; and determining that the condition for switching the master earphone is met when the first distance is greater than the second distance and the third distance is greater than or equal to a first threshold.

3. The method of claim 1, wherein detecting whether the condition for switching the master earphone is met comprises:
acquiring a first received signal strength indicator (RSSI) of a signal received by the mobile terminal from the first earphone; and
determining that the condition for switching the master earphone is met when the first RSSI is less than a preset strength threshold.

4. The method of claim 1, wherein detecting whether the condition for switching the master earphone is met comprises:
acquiring a remaining electric quantity of the first earphone and a remaining electric quantity of the second earphone; and
detecting that the condition for switching the master earphone is met when the remaining electric quantity of the first earphone is less than the remaining electric quantity of the second earphone and a difference between the remaining electric quantity of the first earphone and the remaining electric quantity of the second earphone is greater than a preset remaining electric quantity threshold.

5. A mobile terminal comprising a processor, a memory configured to store one or more programs, wherein the one or more programs are configured to be executed by the processor, and comprise instructions for performing actions, comprising:
detecting whether a condition for switching a master earphone is met when the mobile terminal is in a calling status;
predicting at least one silent time window based on voice call data when the condition is met; and
disconnecting a communication connection between the mobile terminal and a first earphone of a wireless earphone and establishing a communication connection between the mobile terminal and a second earphone of the wireless earphone within a first silent time window, wherein the first silent time window is any one of the at least one silent time window;
wherein the voice call data is between a first user and a second user, the first user is a user of the mobile terminal, and the one or more programs comprise instructions for predicting the at least one silent time window based on the voice call data comprise instructions for performing actions, comprising:
acquiring a first average pause duration of the first user and a second average pause duration of the second user in previous call records between the first user and the second user;
presetting a pause duration in voice data sent from the first user to the second user as a silent time window when the first average pause duration is longer than the second average pause duration; and
presetting a pause duration in voice data sent from the second user to the first user as a silent time window when the second average pause duration is greater than the first average pause duration.

6. The mobile terminal of claim 5, wherein the one or more programs comprise instructions for detecting whether the condition for switching the master earphone is met comprise instructions for performing actions, comprising:
detecting a first distance between the mobile terminal and the first earphone, a second distance between the mobile terminal and the second earphone, and a third distance between the first earphone and the second earphone; and
determining that the condition for switching the master earphone is met when the first distance is greater than the second distance and the third distance is greater than or equal to a first threshold.

7. The mobile terminal of claim 5, wherein the one or more programs comprise instructions for detecting whether the condition for switching the master earphone is met comprise instructions for performing actions, comprising:
acquiring a first received signal strength indicator (RSSI) of a signal received by the mobile terminal from the first earphone; and
determining that the condition for switching the master earphone is met when the first RSSI is less than a preset strength threshold.

8. The mobile terminal of claim 5, wherein the one or more programs comprise instructions for detecting whether the condition for switching the master earphone is met comprise instructions for performing actions, comprising:
acquiring a remaining electric quantity of the first earphone and a remaining electric quantity of the second earphone; and
detecting that the condition for switching the master earphone is met when the remaining electric quantity of the first earphone is less than the remaining electric quantity of the second earphone and a difference between the remaining electric quantity of the first earphone and the remaining electric quantity of the second earphone is greater than a preset remaining electric quantity threshold.

9. A non-transitory computer-readable storage medium configured to store computer programs for electronic data interchange (EDI) which, when executed, are operable with a computer to perform actions, comprising:
detecting whether a condition for switching a master earphone is met when a mobile terminal is in a calling status;
predicting at least one silent time window based on voice call data when the condition is met; and
disconnecting a communication connection between the mobile terminal and a first earphone and establishing a communication connection between the mobile terminal and a second earphone within a first silent time window, wherein the first silent time window is any one of the at least one silent time window;
wherein the voice call data is between a first user and a second user, the first user is a user of the mobile terminal, and in terms of predicting the at least one silent time window based on voice call data when the condition is met, the computer programs for EDI, when executed, are operable with the computer to perform actions, comprising:
acquiring a first speech rate of the first user and a second speech rate of the second user;
presetting a pause duration in the voice data sent from the second user to the first user as a silent time window when the first speech rate of the first user is greater than the second speech rate of the second user; and
presetting a pause duration in the voice data sent from the first user to the second user as a silent time window when the second speech rate of the second user is greater than the first speech rate of the first user.

10. The non-transitory computer-readable storage medium of claim 9, wherein in terms of detecting whether the condition for switching the master earphone is met, the computer programs for EDI, when executed, are operable with the computer to perform actions, comprising:
- detecting a first distance between the mobile terminal and the first earphone, a second distance between the mobile terminal and the second earphone, and a third distance between the first earphone and the second earphone; and
- determining that the condition for switching the master earphone is met when the first distance is greater than the second distance and the third distance is greater than or equal to a first threshold.

11. The non-transitory computer-readable storage medium of claim 9, wherein in terms of detecting whether the condition for switching the master earphone is met, the computer programs for EDI, when executed, are operable with the computer to perform actions, comprising:
- acquiring a first received signal strength indicator (RSSI) of a signal received by the mobile terminal from the first earphone; and
- determining that the condition for switching the master earphone is met when the first RSSI is less than a preset strength threshold.

12. The non-transitory computer-readable storage medium of claim 9, wherein in terms of detecting whether the condition for switching the master earphone is met, the computer programs for EDI, when executed, are operable with the computer to perform actions, comprising:
- acquiring a remaining electric quantity of the first earphone and a remaining electric quantity of the second earphone; and
- detecting that the condition for switching the master earphone is met when the remaining electric quantity of the first earphone is less than the remaining electric quantity of the second earphone and a difference between the remaining electric quantity of the first earphone and the remaining electric quantity of the second earphone is greater than a preset remaining electric quantity threshold.

\* \* \* \* \*